Aug. 1, 1933.   H. R. BIRD   1,920,167
TIRE COVER
Filed Sept. 3, 1930   3 Sheets-Sheet 1

H. R. Bird  Inventor

By C. A. Snow & Co.  Attorneys

Aug. 1, 1933.  H. R. BIRD  1,920,167
TIRE COVER
Filed Sept. 3, 1930    3 Sheets-Sheet 2
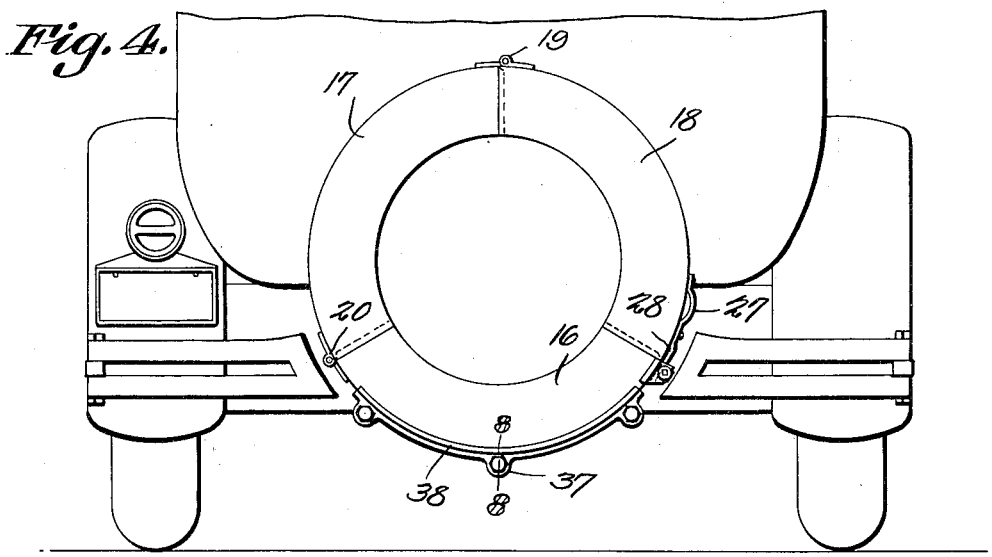
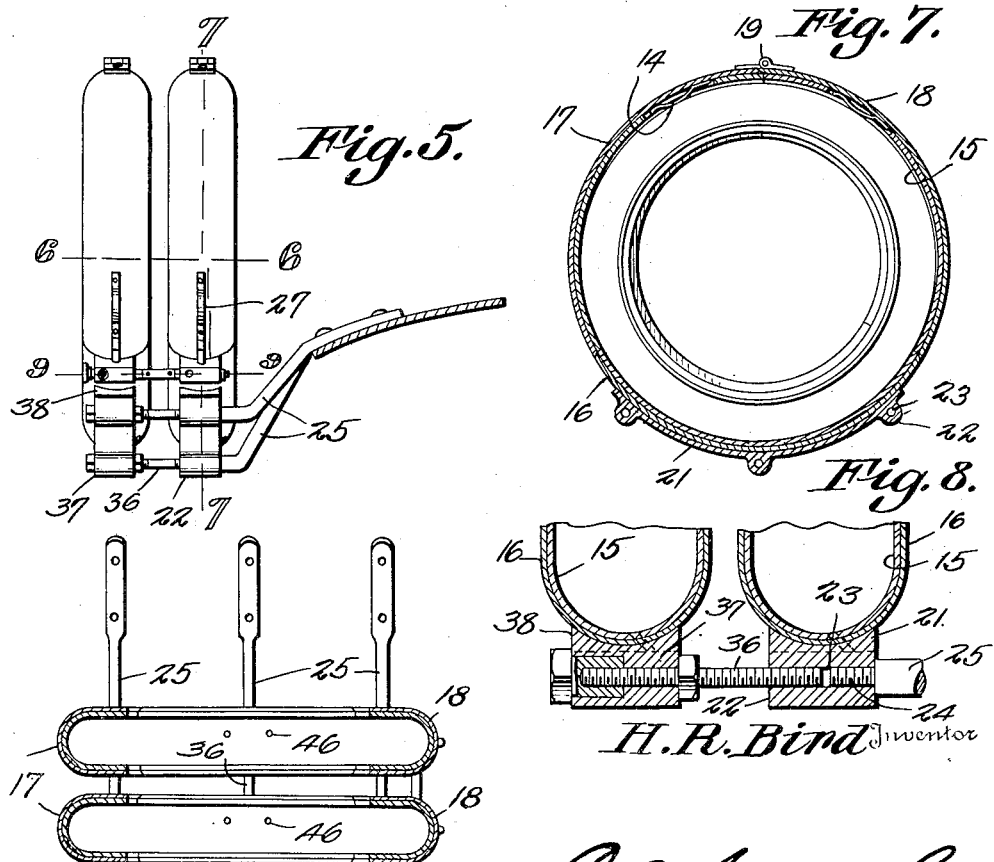

Aug. 1, 1933.   H. R. BIRD   1,920,167
TIRE COVER
Filed Sept. 3, 1930   3 Sheets-Sheet 3
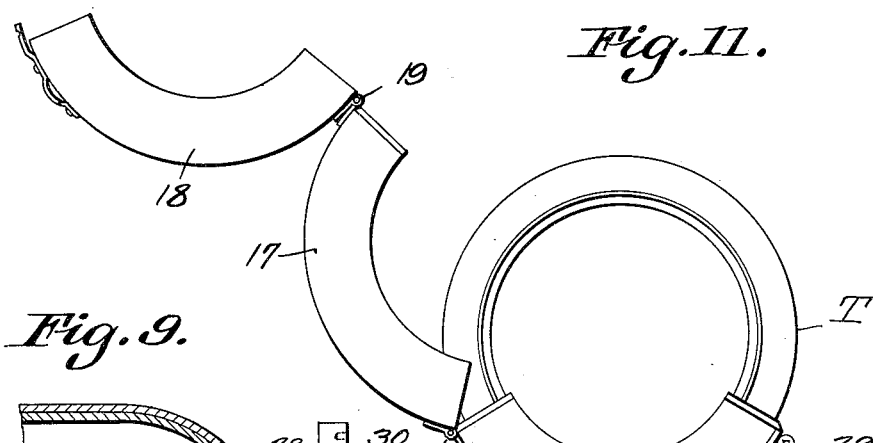
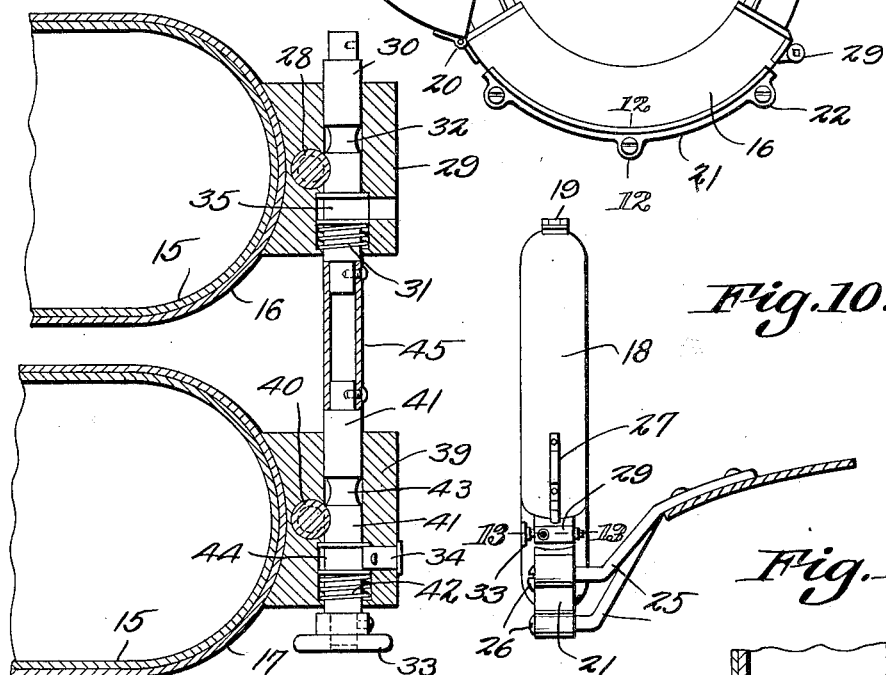

Patented Aug. 1, 1933

1,920,167

UNITED STATES PATENT OFFICE 1,920,167

TIRE COVER

Harry Ray Bird, Taft, Calif.

Application September 3, 1930. Serial No. 479,532

2 Claims. (Cl. 224—29.)

This invention relates to a tire cover for use either on the fender or on rear supporting brackets.

It is an object of the invention to provide a holder made up of hingedly connected sections which, when closed, will fully protect the tire therein, hold it against movement, and prevent unauthorized removal.

Another object is to provide a cover made up of hingedly connected sections which when moved apart, will leave ample space whereby the tire can be rolled into or out of position in the cover.

A still further object is to provide covers which can be assembled in groups, a single lock being provided for holding all of the covers closed.

A still further object is to provide means whereby two covers can readily be joined for the purpose of holding two tires, when desired.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred forms of the invention have been shown.

In said drawings:

Figure 4 is a rear elevation of a portion of a vehicle showing a rear tire cover carried thereby.

Figure 5 is a side elevation showing two tire covers assembled on one supporting means.

Figure 6 is a section on line 6—6, Figure 5.

Figure 7 is a section on line 7—7, Figure 5.

Figure 8 is an enlarged section on line 8—8, Figure 4.

Figure 9 is an enlarged section on line 9—9, Figure 5, said section being taken through one side portion only of the covers.

Figure 10 is a side elevation showing a single cover connected to its supporting means.

Figure 11 is a front elevation thereof opened to release a tire.

Figure 12 is an enlarged section on line 12—12, Figure 11.

Figure 13 is an enlarged section through one side portion of the single cover taken on line 13—13, Figure 10.

Figure 1:
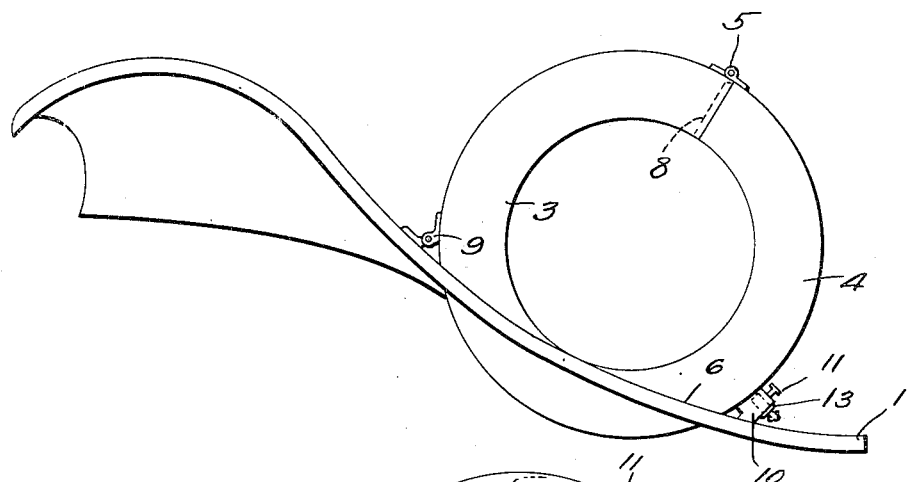
Figure 1 is a side elevation showing the improved tire cover applied to a fender well.

Referring to the figures by characters of reference, 1 designates a portion of a fender having a well 2 of the usual construction for the reception of a spare tire T. Hingedly connected to the fender adjacent to the front end of the well is a segmental cover section 3 formed of metal or any other suitable rigid material and adapted to extend partly around that portion of the tire extending above the well. Another segmental section 4 is hingedly connected at 5 to the section 3 and has its free end 6 so shaped that when the two sections are in tire protecting position, said end will rest flush on fender 1 as shown in Figure 1.

That end 7 of section 3 nearest the well is also so shaped as to fit tightly against the fender when the tire is enclosed. Section 4 has its hinged end so shaped as to form a lap joint with the corresponding end of section 3. This can be done by reducing the end of section 4 as shown at 8 so that it can slip into the end of section 3.

The hinge 9 used for connecting section 3 to the fender can be of any construction desired, but it is preferred to employ a separable hinge such as shown for example in my Patent 1,805,324, dated May 12, 1931.

The free end portion of section 3 of the cover carries a lock casing 10 in which is mounted a locking pin 11 mounted to slide and rotate within opening 12 in the fender 1. This pin is adapted to be secured by means of an ordinary cylinder lock 13 mounted in the casing 10. By inserting a key the cylinder can be released and pulled outwardly so as to permit rotation of pin 11 and its withdrawal from engagement with the fender. Normally, however, the cylinder 13 is secured against movement at which time pin 11 is held so that it cannot be withdrawn from the fender. Consequently the tire will be fastened securely in the cover.

The members of the cover are so shaped transversely as to fit tightly upon the sides of the tire, thereby to protect them from light and excessive moisture.

Spring strips 14 can be arranged within the sections 3 and 4 for pressing against the held tire when the cover is closed. Furthermore the sections as well as the well can be provided with soft linings 15 for engaging the tire to prevent injury thereto by rubbing against the adjacent parts.

While the cover can be mounted on a fender as shown it is possible, through a slight modification thereof, to arrange it at the back of a vehicle. Under these conditions the cover is formed with a bottom segmental section 16 to one end of which is hingedly connected a segmental section 17. Another segmental section 18 can be hingedly connected at 19 to the section 17. The hinge 20 used for connecting the sections 16 and 17 can be of any construction although it is preferred to employ a separable hinge such as described in my patent hereinbefore referred to.

The bottom section 16 is made integral with or fixedly connected to a yoke 21 on which are formed ribs 22 each of which has a longitudinal bore 23. These bores are screw-threaded and are adapted to receive short threaded studs 24 extending from arms 25 which project rearwardly from the vehicle and constitute supports for the tire cover. Where only one tire cover is mounted on the supporting arms the outer ends of the bores 23 can be closed by screw plugs 26 as shown in Figures 10 and 12. The section 18 of the cover is provided, adjacent to its free end, with a handle 27 whereby it can be swung upwardly and from this handle may be extended a pin 28 adapted to be inserted downwardly through a casing 29 secured to and extending from section 16 close to the end thereof.

In casing 29 is mounted a sliding bolt 30 having a spring 31 adapted normally to thrust the bolt in one direction so as to engage within an annular groove the pin 28 and prevent withdrawal of the pin from the casing 29. An annular groove 32 is formed in the bolt and when the bolt is pulled longitudinally from normal position this groove will be brought opposite to the pin 28 thereby to permit withdrawal of the pin from the casing 29.

A knob 33 is detachably connected to the bolt 30 and a cylinder lock 34 is removably mounted in casing 29. This cylinder lock when secured in innermost position projects into an annular groove 35 in bolt 30 so as to hold the bolt in position where it will lock pin 28 against withdrawal. By inserting a proper key into the cylinder lock to release it from the grooved bolt, said bolt will be permitted to shift so as to bring groove 32 to position opposite pin 28, thereby to permit withdrawal of the pin and opening of the cover.

Should it be desired to use two tire covers at the back of the vehicle, screw plugs 26 should be removed and spacing pins 36 screwed into the bores 23. These pins also engage ribs 37 formed on a yoke 38 which is connected to the bottom section 16 of a supplemental cover. This supplemental cover has a lock casing 39 similar to casing 29 for the reception of a pin 40 corresponding with the pin 28.

A bolt 41 which is like bolt 30 is slidable in casing 39 and has a spring 42 for holding it normally pressed in one direction for the purpose of engaging in an annular groove in pin 40 to prevent withdrawal of the pin. Bolt 41 also has a groove 43 for the release of pin 40 and a groove 44 for the reception of a cylinder lock. When the supplemental tire cover is assembled with the cover already in position, the knob 33 is removed from bolt 30 and a spacer or coupling sleeve 45 is interposed between and secured to the two bolts 30 and 41. Knob 33 is attached to the projecting end of bolt 41 and the cylinder lock 34 is removed from casing 29 and inserted into casing 39 where it can be placed in engagement with bolt 41.

With the bolts thus connected they can both be secured in locking position by means of lock 34 and when it is desired to remove either or both of the tires from their holders or covers, the lock 34 is disengaged from bolt 41. Both bolts 30 and 41 will then shift to releasing position so that either or both pins 28 and 40 can be lifted to release the tire or tires held in position.

Figure 2:
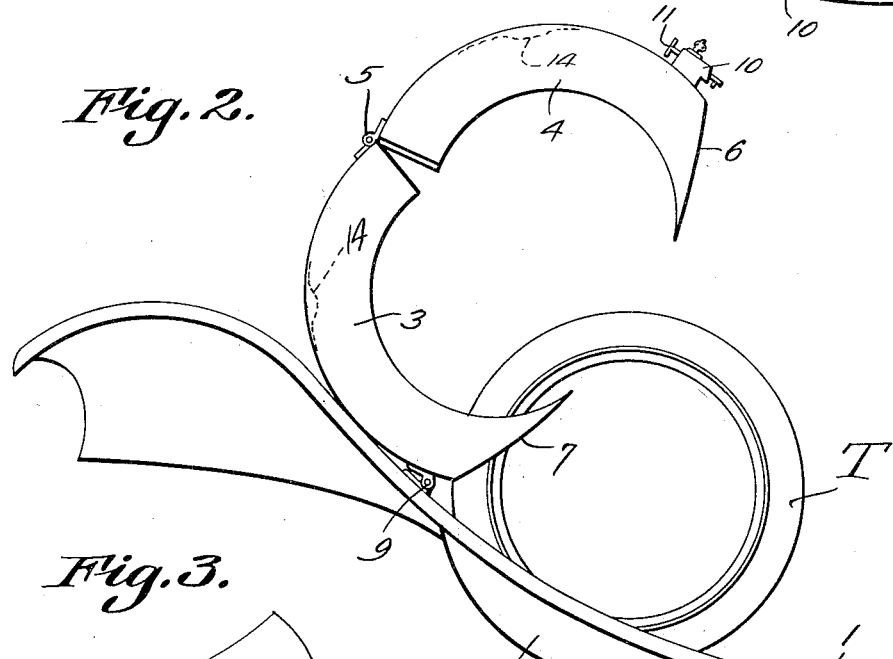
Figure 2 is a similar view showing the cover opened and the tire exposed for ready removal.
Figure 3:
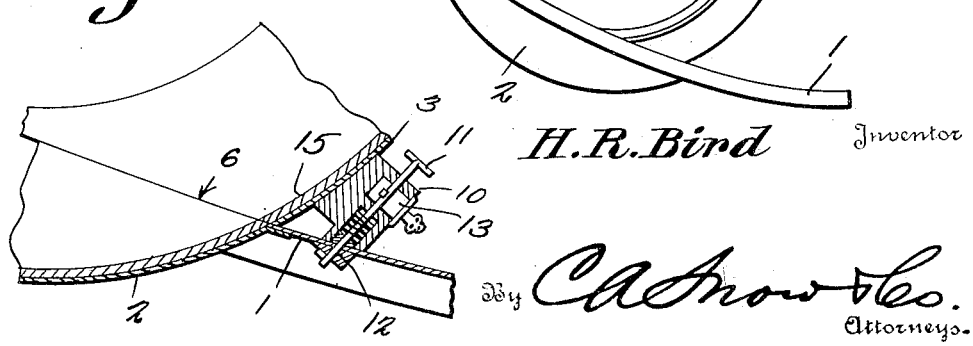
Figure 3 is a vertical longitudinal section through a portion of the fender and well and showing the cover lock in section.

The tire covers shown in Figures 4 to 13 inclusive are all provided with linings and springs such as described in connection with the structure illustrated in Figures 1, 2 and 3.

As shown in Figure 6 the bottom sections of the tire covers can be provided with drain openings 46 through which moisture seeping into the cover can be discharged.

What is claimed is:

1. The combination with parallel threaded studs, and means for joining them to a support, of a sectional tire cover, a yoke fixedly attached thereto having parallel bores in which the studs are removably mounted, a second tire cover, a yoke thereon having parallel bores, spacing pins seated in the last named bores and threaded into the first named bores, for holding the covers rigidly but detachably spaced, said pins and studs being respectively alined.

2. The combination with parallel threaded studs, and means for joining them to a support, of a sectional tire cover, a yoke fixedly attached thereto having parallel bores in which the studs are removably mounted, a second tire cover, a yoke thereon having parallel bores, spacing pins seated in the last named bores and threaded into the first named bores, for holding the covers rigidly but detachably spaced, said pins and studs being respectively alined, and a lock for securing the sections of both of the covers against relative movement, said lock having separable cooperating sections carried by the respective covers.

HARRY RAY BIRD.